United States Patent
Das et al.

(10) Patent No.: US 7,961,683 B2
(45) Date of Patent: Jun. 14, 2011

(54) ACTIVE SESSION MOBILITY SOLUTION FOR POINT-TO-POINT PROTOCOL

(75) Inventors: Suman Das, Scotch Plains, NJ (US); Anand Kagalkar, Edison, NJ (US); Sarit Mukherjee, Morganville, NJ (US); Sureshbabu P. Nair, Whippany, NJ (US); Priya Rajan, Somerset, NJ (US); Ajay Rajkumar, Morristown, NJ (US); Sampath Rangarajan, Bridgewater, NJ (US); Michael D. Turner, Madison, NJ (US); Harish Viswanathan, Basking Ridge, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 705 days.

(21) Appl. No.: 10/954,973

(22) Filed: Sep. 30, 2004

(65) Prior Publication Data

US 2006/0072512 A1 Apr. 6, 2006

(51) Int. Cl.
*H04W 4/00* (2009.01)
(52) U.S. Cl. .................................................. 370/331
(58) Field of Classification Search .......... 370/331–334
See application file for complete search history.

(56) References Cited

U.S. PATENT DOCUMENTS

| | | | |
|---|---|---|---|
| 6,301,479 B1* | 10/2001 | Roobol et al. | 455/436 |
| 6,466,964 B1* | 10/2002 | Leung et al. | 709/202 |
| 6,876,640 B1* | 4/2005 | Bertrand et al. | 370/331 |
| 2002/0013147 A1* | 1/2002 | Fauconnier et al. | 455/422 |
| 2002/0015396 A1* | 2/2002 | Jung | 370/338 |
| 2002/0018472 A1* | 2/2002 | Rinne et al. | 370/394 |
| 2003/0002467 A1* | 1/2003 | Leung | 370/338 |
| 2003/0142648 A1* | 7/2003 | Semper | 370/331 |
| 2003/0224758 A1* | 12/2003 | O'Neill et al. | 455/411 |
| 2005/0185619 A1* | 8/2005 | Niemela et al. | 370/331 |

FOREIGN PATENT DOCUMENTS

| | | |
|---|---|---|
| EP | 05 25 5864 | 1/2006 |
| WO | WO 01/61934 A | 8/2001 |
| WO | WO 02/47317 A | 6/2002 |

OTHER PUBLICATIONS

Krishnamurthi et al., Mar. 1, 2001, IETF, "Buffer Management for Smooth Handovers in IPv6".*
http://www.tcpipguide.com/free/t_MobileIPDataEncapsulationandTunneling.htm, Aug. 25, 2004, WayBack Machine Internet Archive, p. 1.* Govind Krishnamurthi Nokia Research Center Robert C Chalmers UC Santa Barbara Charles E Perkins Nokia Research Center: "Buffer Management for Smooth Handovers in IPv6" IETF Standard-Working-Draft, Internet Engineering Task Force, IETF, CH, No. 1, Mar. 1, 2001, XP015023315 ISSN: 0000-0004.
Campbell J Gomez C-Y Wan S Kim Columbia University Z Turanyi A Valko Ericsson A: "Cellular IP" IETF Standard-Working-Draft, Internet Engineering Task Force, IETF, CH, vol. mobileip, Jan. 2000 XP015023315 ISSN: 0000-0004.
Caceres R et al: "Fast and scalable handoffs for wireless internetworks" MOBICOM. Proceedings of the Annual International Conference on Mobile Computing and Networking, 1996, pp. 56-66, XP002962801.

* cited by examiner

*Primary Examiner* — Lester Kincaid
*Assistant Examiner* — Steven Lim
(74) *Attorney, Agent, or Firm* — Wall & Tong, LLP

(57) ABSTRACT

An active session mobility solution for point-to-point protocol (PPP) in accordance with the present invention provides fast and smooth handoff by reducing tunneling overhead on tunneling mechanisms, such as P-P tunneling from a serving Source (e.g., a PPP termination device) to a new serving Target (e.g., a PPP termination device). In the active session mobility solution of the present invention, PPP session can be migrated even if not all phases have been completed (e.g., LCP, PAP/CHAP completed but not IPCP and CCP). In such cases, the incomplete phases will be negotiated at the PPP of the Target PPP.

30 Claims, 6 Drawing Sheets

ACTIVE SESSION MOBILITY SOLUTION FOR POINT-TO-POINT PROTOCOL

FIELD OF THE INVENTION

The present invention relates to mobile communications systems and, more specifically, to mobility management techniques in such systems that support multimedia applications in a highly dynamic Internet Protocol-based networking environment.

BACKGROUND OF THE INVENTION

Considerable attention has been directed toward the implementation of mobile telecommunication service in computer data networks, and particularly the ability to route communication content to mobile wireless nodes that routinely connect to the data network at different points of attachment, via air interfaces. These include cellular telephones, Personal Digital Assistants (PDAs), laptop computers, and other mobile wireless communication equipment.

To facilitate mobile wireless telecommunication service in a data network, it is desirable (although not always possible) to allow mobile wireless nodes to change their link-layer point of network attachment without reassigning a new network address. According to current data network telecommunication standards for mobile equipment in general (e.g., the "Mobile IP" standards promulgated by the Internet Engineering Task Force (IETF) or the General Packet Radio Service (GPRS) standards proposed by the European Telecommunication Standards Institute (ETSI)), one way to provide the desired network address transparency is to employ "mobility agents." These are network routing nodes that route communication content on behalf of mobile nodes as they move around the network. For example, according to the IETF Mobile IP standards, a mobile node's mobility agents may consist of a "home agent" routing node and may also include a "foreign agent" routing node. The home agent is a routing node in the mobile node's subnetwork that maintains a network interface on the link indicated by the mobile node's "home address," which is a network address intended to remain assigned to the mobile node for an extended time period. When the mobile node is away from its home subnetwork, the home agent intercepts communication content bound for the mobile node's home address and tunnels it for delivery to a "care-of" address assigned to the mobile node when the mobile node registers on a foreign subnetwork. The care-of address may be the address of a foreign agent routing node in the foreign subnetwork.

Correspondent nodes wishing to communicate with a foreign-registered mobile node are able to address their communication content to the mobile node's home address. Transparently, the communication content is tunneled to the mobile node's care-of address and delivered to the mobile node on the foreign subnetwork. Normal routing may be used for sending return communication content from the mobile node to the correspondent node.

Some link-level protocols used to support mobile node communications include a Point-to-Point Protocol and a Radio Link Protocol. Protocols typically utilized in non-mobile applications, such as the Internet Protocol (IP) and the Point-to-Point protocol (PPP), are layered on top of a lower level mobile protocol, such as the Radio Link Protocol (RLP) defined by the Third Generation Partnership Project 2 (3GPP2). More specifically, when a mobile node connects to a gateway on the Internet, a Point-to-Point Protocol (PPP) session is typically established between the mobile node and the gateway device. As is known in the art, PPP is used to encapsulate network layer datagrams over a serial communications link. For more information on PPP see Internet Engineering Task Force ("IETF") Request for Comments ("RFC"), RFC-1661, RFC-1662 and RFC-1663 incorporated herein by reference in its entirety. The gateway, or tunnel initiator, typically initiates establishment of a tunnel connection to a tunnel endpoint server. For example, when a mobile node is connected to a foreign agent, a connection oriented point-to-point communication link, such as a Layer 2 Tunneling Protocol (L2TP) tunnel, is typically established between the foreign agent and the home agent to permit the transfer of data to and from the mobile node. See Layer Two Tunnelling Protocol (L2TP), Request for Comment (RFC) 2661, A. Valencia, et al., June 1999, herein incorporated by reference in its entirety.

In a wireless environment, reliable end to end transmission is commonly provided by a Radio Link Protocol (RLP) that is highly optimized for the particular wireless transmission media that are in use. Examples of RLP protocols can be found in TIA/EIA IS-707 (for CDMA) and IS-135 (for TDMA). RLP is a reliable link protocol that allows retransmission from a source to a destination of the link of lost control packets or lost new and retransmitted data packets. The scheme allows the sender to retransmit the unacknowledged or negatively acknowledged packets preemptively at the link layer rather than rely on end-to-end retransmissions by higher layer protocols. This scheme can efficiently improve performance since it prevents end-to-end retransmissions and transport layer time-outs. The foregoing routing mechanisms may also be used for mobile wireless nodes connected to a foreign subnetwork via an air interface. However, a problem may arise if the mobile wireless node is being actively transported while communicating over the data network and a call handoff is required from one radio base station to another. In that case, the old base station may be linked to one foreign agent, while the new base station is linked to another foreign agent. Call handoff then requires that the communication tunneling endpoint be transferred from the old care-of address to the new care-of address.

This may create gaps that interrupt the timely delivery of call content, which can degrade communication quality, particularly for voice telephony. Such gaps arise from the inability of the data network to coordinate well with the air interface so as to determine the exact time of handoff. Delay can occur between the point of handoff and the point at which the home agent begins routing communication content to the new care-of address.

Accordingly, there is a need in a data network telecommunication system serving mobile wireless nodes for improved call handoff without loss of communication content. What is required is a system and method that seamlessly routes communication content during handoff so that the mobile wireless node does not experience noticeable communication content loss or delay other than that caused by the air interface, if any.

SUMMARY OF THE INVENTION

The present invention addresses various deficiencies of the prior art by providing a seamless active session mobility solution for point-to-point protocol.

In one embodiment of the present invention, a method for seamless active session migration of a point-to-point protocol (PPP) session from a source to a target in a wireless IP network includes in a forward-link direction, tunneling framed data from the source to the target, determining a future IP data sequence number by which framing of IP data will begin at the target, and upon receiving an acknowledgment from the target, tunneling IP data having sequence numbers greater than the determined IP data sequence number to the target to be processed by the target.

In a reverse-link direction one embodiment of a method for seamless active session migration of a point-to-point (PPP) protocol session from a source to a target in a wireless IP network includes causing the target to stop tunneling reverse-link IP data to be framed by the source to the source, framing and buffering newly received reverse-link IP data in the target, and upon receiving an indication from the source that a last IP data has been framed and communicated by the source, processing the buffered IP data in the target.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention advantageously provides a seamless active session mobility solution for point-to-point (PPP) protocol. Although various embodiments of the present invention are described herein with respect to a flat network architecture based on base station routers (BSRs) described in a commonly assigned patent application serial number, entitled "A wireless communications system employing a network active set formed from base stations operable as primary and secondary agents", the specific embodiments of the present invention should not be treated as limiting the scope of the invention. It will be appreciated by those skilled in the art and informed by the teachings of the present invention that the PPP active session mobility solution of the present invention may be advantageously implemented in substantially any network or network applications implementing PPP, such as conventional CDMA hierarchical networks, modem dial-up, DSL and also to provide Layer 2 tunnels such as L2TP and PPTP.

Figure 1:
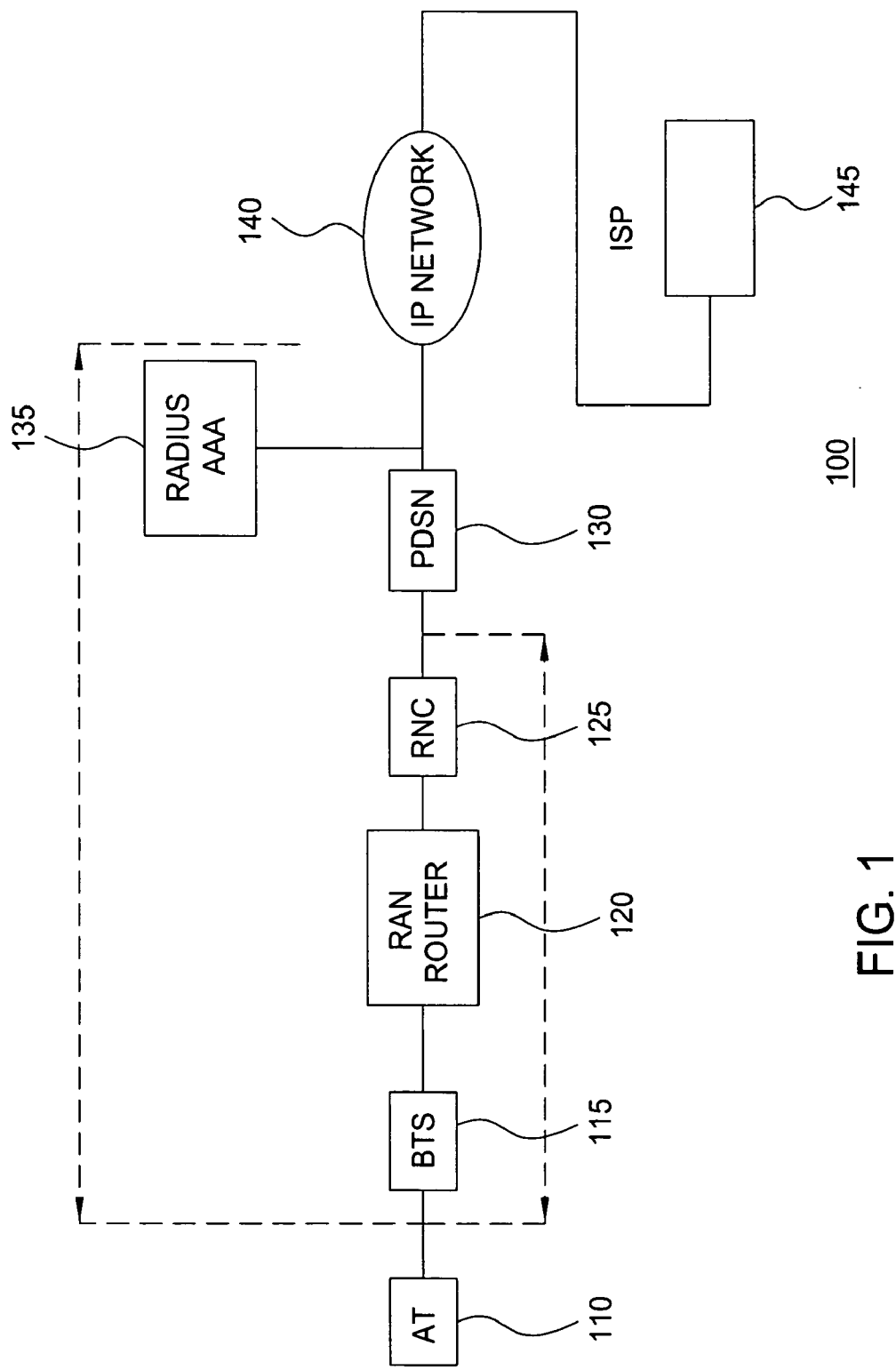
FIG. 1 depicts a high level block diagram of a conventional CDMA hierarchical wireless IP network.

To assist in the description of various mobile IP protocols associated with the implementation of various embodiments of the present invention, the inventors herein depict a conventional hierarchical CDMA wireless IP network. FIG. 1 depicts a high level block diagram of a conventional CDMA hierarchical wireless IP network. The hierarchical CDMA network 100 of FIG. 1 comprises an access terminal (AT) 110, a Base Transceiver Station (BTS) 115, a RAN router 120, a radio network controller (RNC) 125, a PDSN 130, an IP network 140 and an Internet service provider (ISP) 145. Although the CDMA network 100 of FIG. 1 further depicts a RADIUS Authentication, Authorization, and Accounting (AAA) server 135, the AAA server 135 is merely depicted for providing a complete depiction of the CDMA network 100. As the function of the AAA server 135 is ancillary to the concepts of the present invention, the AAA server 135 will not be described herein.

In the hierarchical CDMA network 100 of FIG. 1, the BTS 115 performs the function of interfacing to the AT 110 over the air interface. It contains the hardware and software to perform the digital signal processing required to implement the air interface, and to communicate with back-end servers and routers. The HCS 115 also contains the RF components required to transmit the signals over the air, and to receive the RF signals from the AT 110.

The RAN Router 120 provides a common point in the CDMA network 100 where the back haul interfaces from several BTSs may terminate. This function is required to allow routing of information received from the air interface to a control point for a session, where frame selection can be performed. The RAN router 120 also allows routing of data between the BTSs and the ISP 145 in a global internet.

The RNC 125 provides signaling and traffic processing control for each session. These functions include session establishment and release, frame selection and Radio Link Protocol (RLP) processing. As previously mentioned, RLP is a reliable link protocol between, for example the AT 110 and the RNC 125, that allows retransmission from a source to a destination of the link of lost control packets or lost new and retransmitted data packets. The scheme allows the sender to retransmit the unacknowledged or negatively acknowledged packets preemptively at the link layer rather than rely on end-to-end retransmissions by higher layer protocols. This scheme can efficiently improve performance since it prevents end-to-end retransmissions and transport layer time-outs. The RNC 125 provides the processing for the standard interface to the PDSN 130 and allows the RNC functions to interface to the PDSN 130. The RNC 125 terminates all mobility management functions of the radio network, and is the demarcation point between the Radio Network and the IP Network 140 which ultimately communicates with the ISP 145.

The PDSN 130 terminates the point-to-point protocols (PPP), and/or generates a tunnel to a Layer 2 Tunnel Protocol Network Server (LNS) if L2TP Internet access is being used. The PDSN 130 resides in the serving network, and is allocated by the serving network where the AT 110 initiates a service session. The PDSN 130 terminates a residing PPP link protocol with the AT 110. The PDSN 130 serves as a Foreign Agent (FA) in the network 100. The PDSN 130 maintains link layer information and routes packets to external packet data networks or to a Home Agent (HA) in the case of tunneling to the HA. The PDSN 130 also maintains an interface to the backbone IP network 140.

The PDSN 130 maintains a serving list and unique link layer identifier for all the ATs that have an active session with the PDSN 130. The PDSN 130 uses this unique link layer identifier to reference each AT connected to the PDSN 130, and maintains an association between the IP address of the AT and the HA address and the link identifier. The link layer association is maintained at the PDSN 130 even when the AT 110 is dormant. When the AT 110 moves to a location served by a different RNC 125, the PDSN 130 interacts with a new serving RNC to facilitate a handoff from the RNC with which the AT 110 had an active session.

The PPP protocol provides a mechanism to establish a point-to-point link between two devices, such as the AT and a PDSN, and then encapsulates and transports different network layer protocol packets over this link. There are two phases to the establishment of a PPP link. In the first phase called the Link Control Phase, the establishment of the point-to-point link is negotiated through a component called the Link Control Protocol (LCP) and then the user is authenticated using an authentication protocol such as CHAP (Challenge Handshake Authentication Protocol) or PAP (Password Authentication Protocol). In the second phase called the Network Control Phase, a component called the Network Control Protocol (NCP) is used to manage the specific needs of the protocol packets that will be transported over the PPP link. Within the context of CDMA2000, a PPP link is established between the AT and the PDSN and then IP packets are encapsulated and communicated over this link. The NCP that is specific to transporting IP packets over the PPP link is the Internet Protocol Control Protocol (IPCP). The IPCP enables the PDSN to assign an IP address to the AT and also enables the negotiation of a header compression algorithm that will be used to compress TCP/IP or IP/UDP/RTP headers. In addition, the Network Control Phase consists of another component known as the PPP Compression Control Protocol (CCP) that is used to negotiate payload compression algorithm that may be used on packets transported over the PPP link. Once the Link Control Phase and the Network Control Phase are complete, IP packets are encapsulated and tunneled over the PPP link.

Mobility needs to be addresses at different levels within the hierarchical CDMA network 100 of FIG. 1. For example, the AT 110 could move between different base stations (not shown) controlled by the same RNC, or between different RNCs controlled by the same PDSN. In all these cases, the PPP session between the AT 110 and the PDSN 130 remains intact and the movement is transparent to the link-layer (PPP) and the layers above (IP and TCP/UCP). But at the highest level of the hierarchy, it is possible that the AT 110 moves between base stations that are hierarchically controlled by different PDSNs to terminate the ATs PPP sessions.

In contrast to the above hierarchical architecture of the CDMA network 100 of FIG. 1, a flat network architecture is proposed in a commonly assigned patent application entitled "A wireless communications system employing a network active set formed from base stations operable as primary and secondary agents", which incorporates the RNC and PDSN functions together with the Cell Site equipment into one network element that connects directly to the Internet. This concept therefore has the potential to reduce the cost and complexity of deploying a conventional hierarchical network, and of adding new wireless access points (cell sites) to an already deployed network. In such a flat network, deployment cost is reduced compared with the traditional network architecture because the centralized RNC functions and the centralized PDSN functions are incorporated into the cell site equipment. Also, there is a potential to reduce the delay experienced by a wireless user, because the packet queuing delays at the PDSN and at the RNC are removed. Such a flat architecture is referred to as a Base-Station-Router (BSR) type network architecture.

Figure 2:
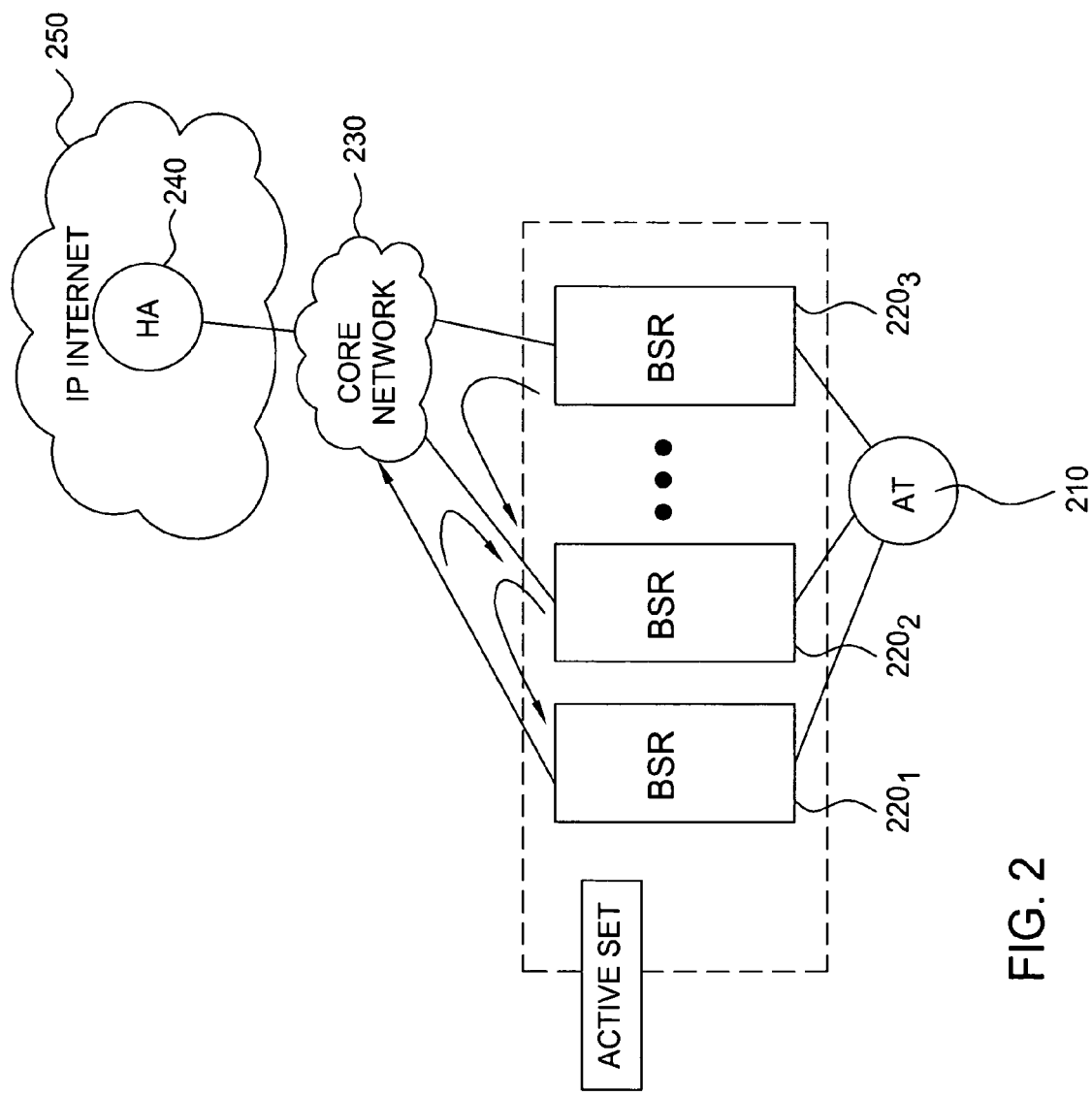
FIG. 2 depicts a high level block diagram of a Base-Station-Router (BSR) type network architecture where an embodiment of the present invention may be applied.

For example, FIG. 2 depicts a high level block diagram of a novel Base-Station-Router (BSR) type network architecture where an embodiment of the present invention may be applied. Such a Base-Station-Router type network architecture is described in commonly assigned U.S. patent application entitled "A wireless communications system employing a network active set formed from base stations operable as primary and secondary agents", which is herein incorporated by reference in its entirety. The BSR network 200 of FIG. 2 illustratively comprises an access terminal (AT) 210 (also referred to as a mobile herein), a plurality of base station routers (BSRs) (illustratively 3 BSRs) $220_1$-$220_3$, a core network 230, a home agent (HA) 240 and an IP Internet 250. In the BSR network 200 of FIG. 2, unlike in conventional IP networks, radio network control functions such as call admission control, CDMA code tree management, and paging control are contained within each of the base station routers $220_1$-$220_3$. More specifically, different ones of the base station routers $220_1$-$220_3$ are able to serve as the primary agent (PA) for different mobiles, unlike in conventional IP network architectures where a single radio network controller (RNC) performs the resource management for all of the mobiles of the set of base stations it controls. In the BSR network 200 of FIG. 2, the core network 230 functions to ensure the efficient and timely delivery of data packets between the BSRs $220_1$-$220_3$. The core network 230 also operates to communicate the reverse link data from the BSRs $220_1$-$220_3$ intended for the HA 240 to the IP Internet 250, which forwards the data to the HA 240. In the forward link direction, the core network 230 functions to communicate data received from the HA 240 through the IP Internet 250 intended for the mobile 210 to the BSRs $220_1$-$220_3$.

In the BSR network 200 of FIG. 2, mobile 210 is in communication with the three BSRs $220_1$-$220_3$ which comprise a network active set (NAS) of the mobile 210. Based on changing radio conditions, mobile 210 may choose to receive data from any of the BSRs within its NAS. Switching may occur on a fast time scale. Within the NAS, one of the BSRs $220_1$-$220_3$ functions as a primary agent (PA) while the other BSRs may function as secondary agents (SA). The PA serves as the anchor for mobility and radio resource management and performs function similar to the RNC in traditional hierarchical network architectures. Although the novel BSR network architecture described above greatly reduces the number of components required in an IP network and thus greatly reduces the costs associated with an IP network, in such BSR network architectures there exist more handoffs between base station routers due to the movement of an access terminal through the network and, as such, a need exists for an efficient, active session mobility solution for PPP. That is, in a BSR architecture, each BSR serves as a base station, RNC, and PDSN.

As in conventional CDMA systems, in the BSR network 200 of FIG. 2, a mobile that powers up in the vicinity of the active set of BSRs $220_1$-$220_3$ acquires a pilot signal from each of the BSRs $220_1$-$220_3$ and uses the access channel to communicate with the base station from which it received the strongest signal to initiate a session. As previously mentioned, the selected BSR having the strongest signal (initially and illustratively BSR $220_1$) serves as a primary agent (PA) and, as such, an access point for the mobile 210. In the BSR network 200 of FIG. 2, the BSR $220_1$ is considered the source BSR and initially terminates the wireless base-station MAC protocol normally maintained in a base station of a traditional hierarchical network architecture, the RLP protocol normally maintained in a RNC of a traditional hierarchical network architecture, as well as the (point-to-point) PPP protocol normally maintained in a packet serving data node (PDSN) of a traditional hierarchical network architecture.

Figure 3:
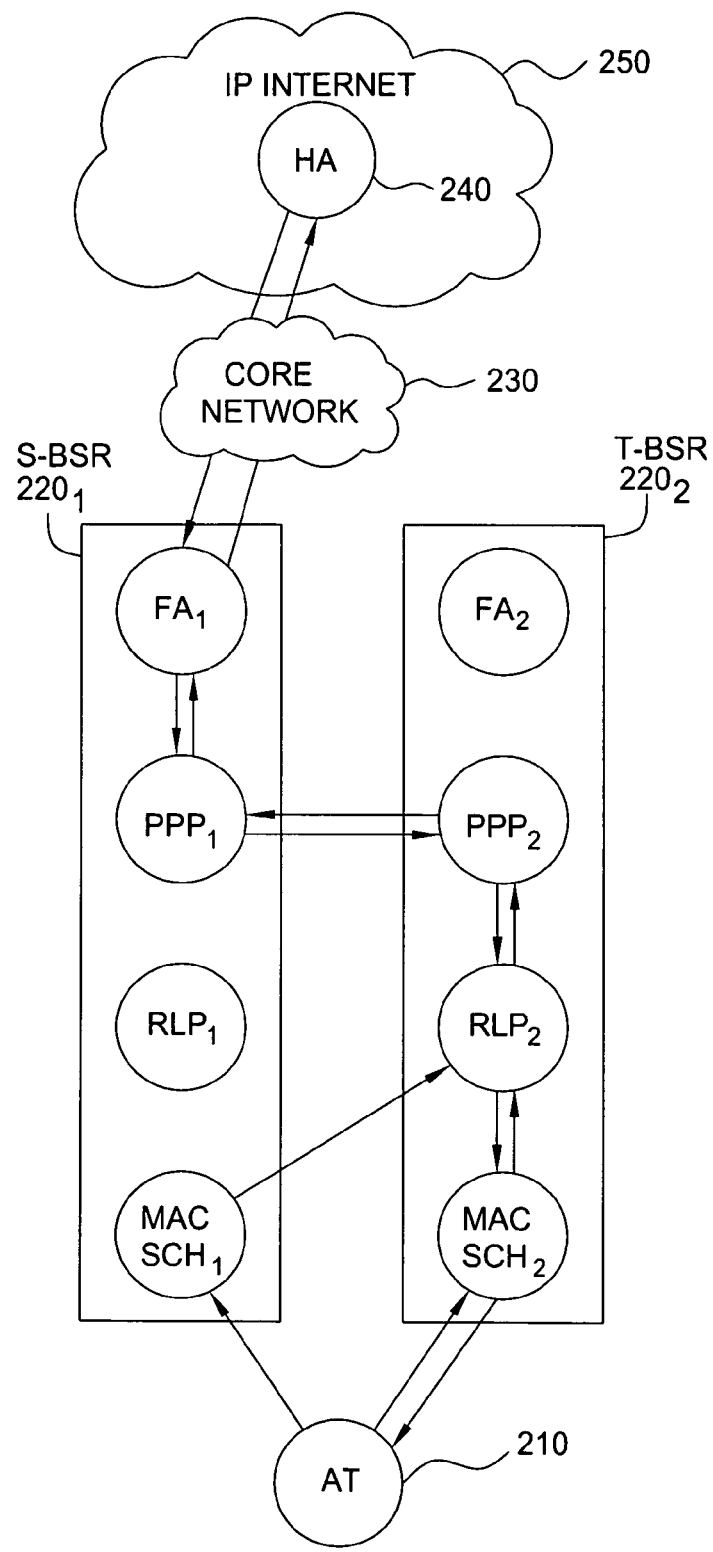
FIG. 3 depicts a high level functional diagram of the Base-Station-Router network of FIG. 1 during an initial state just prior to the transfer of the point-to-point protocol (PPP) from a Source BSR to a Target BSR.

FIG. 3 depicts a high level functional diagram of the BSR network 200 of FIG. 2 during an initial state just prior to the transfer of the PPP from the Source BSR $220_1$ to the Target BSR $220_2$. The Source BSR $220_1$ of FIG. 3 illustratively comprises a MAC/Scheduler functional block (MAC/SCH$_1$), an RLP functional block (RLP$_1$), a PPP functional block (PPP$_1$), and an FA functional block (FA$_1$). Similarly, the BSR $220_2$ of FIG. 3 illustratively comprises a MAC/Scheduler functional block (MAC/SCH$_2$), an RLP functional block (RLP$_2$), a PPP functional block (PPP$_2$), and an FA functional block (FA$_2$). As depicted in the BSR network 200 depicted in FIG. 3, initially the PPP processing (PPP protocol) and the Foreign Agent functions (FA) are occurring in the Source BSR $220_1$ while the RLP and MAC processing, including the Frame Selection, are occurring in the Target BSR $220_2$.

That is, in the initial state depicted in FIG. 3 in the forward-link direction, the HA 240 communicates forward-link data through to the FA (FA$_1$) of the Source BSR $220_1$ and the FA (FA$_1$) of the Source BSR $220_1$ communicates the data to the PPP (PPP$_1$) of the Source BSR $220_1$. The PPP (PPP$_1$) of the Source BSR $220_1$ then tunnels the PPP data to the PPP (PPP$_2$) of the Target BSR $220_2$, which communicates the data to the RLP (RLP$_2$) of the Target BSR $220_2$. The RLP (RLP$_2$) of the Target BSR $220_2$ communicates the data to the MAC (MAC/SCH$_2$) of the Target BSR $220_2$, which then communicates the data over the air to the mobile 210.

In the reverse-link direction, the mobile 210 broadcasts the data to all of the BSRs in the active set (illustratively, BSRs $220_1$-$220_2$). The MAC/Scheduler (MAC/SCH$_1$) of the Source BSR $220_1$ and the MAC/Scheduler (MAC/SCH$_2$) of the Target BSR $220_2$ both communicate the data to the RLP (RLP$_2$) of the Target BSR $120_2$. The RLP (RLP$_2$) of the Target BSR $220_2$ communicates the data to the PPP (PPP$_2$) of the Target BSR $220_2$, which tunnels the data to the PPP (PPP$_1$) of the Source BSR $220_1$. The PPP (PPP$_1$) of the Source BSR $220_1$ communicates the data to the FA (FA$_1$) of the Source BSR $220_1$, which then communicates the data to the HA 240.

In one embodiment of the present invention, PPP migration occurs immediately following migration of the reverse-link RLP in the BSR network 200. Alternatively, PPP migration may occur after the expiration of a timer that is initiated after the migration of the reverse-link RLP in the BSR network 200. More specifically and for example, after the transfer of the reverse-link RLP from a Source BSR to a Target BSR, the Source BSR or the Target BSR may initiate a timer that must expire before the PPP in the Source BSR may be transferred to a Target BSR. That is, when a mobile decides that it would like to receive data from a Target BSR (i.e. because the mobile is receiving a stronger signal from the Target BSR) the forward-link RLP in the Source BSR is transferred to the Target BSR. Some time after the transfer of the forward-link RLP from the Source BSR to the Target BSR, the reverse-link RLP is transferred to the Target BSR. After the transfer of the forward-link RLP and the reverse-link RLP to the Target BSR, the mobile may thereafter revert back to receiving a stronger signal from the original Source BSR or encounter a subsequent BSR from which it is receiving a stronger signal. As such, in embodiments of PPP mobility solutions implementing a timer for controlling the transfer of PPP, the PPP may be maintained in the Source BSR for a period of time long enough for the mobile to regain a stronger signal from the Source BSR or to attain a stronger signal from a subsequent, second Target BSR. In the former case, the PPP function would remain in the Source BSR and the forward-link RLP and the reverse-link RLP may revert back to the Source BSR. In the latter case, the forward-link RLP and the reverse-link RLP may transfer from the Target BSR to the subsequent, second Target BSR and, if the timer expires, the PPP may then be transferred from the Source BSR directly to the subsequent, second Target BSR, therefore eliminating the need to transfer the PPP to the first Target BSR. As such, the optional timer implemented in the various embodiments of PPP mobility solutions in accordance with the present invention may function to reduce the number of times that the PPP needs to be transferred and avoid ping-pong effects.

The migration of RLP in the BSR network 200 is described in a commonly assigned patent application entitled "Active Session Mobility Solution for Radio Link Protocol", filed simultaneously herewith and which is herein incorporated by reference in its entirety. In general, an RLP mobility solution in a network, such as the BSR network 100, as taught by the patent application entitled "Active Session Mobility Solution for Radio Link Protocol" comprises two RLP migrations states. A first state is defined as a forward-link RLP state and depicts the communication of data from a home agent to an active terminal through the network and a second state is defined as a reverse-link RLP state and depicts the communication of data from the active terminal to the home agent through the network. Furthermore, the RLP mobility solution includes a two-stage RLP transfer process for the migration of the two defined states from a source to a target. In the first stage of the RLP mobility solution, forward-link RLP state is transferred from a source to a target. In a second stage, frame selection and reverse-link RLP are transferred from the source to the target.

In any case, in the BSR network 200, PPP migration occurs after the migration of the reverse-link RLP. In accordance with the present invention, PPP migration may be eased by requiring PPP transfer to occur on an IP frame boundary (forward link) and the PPP frame boundary (reverse link). With this requirement, PPP may be migrated with minimal state information as each complete PPP frame is independent of previous frames (not accounting for header/payload compression).

In the forward-link direction, when an indication (i.e., the expiration of a timer or the migration of reverse-link RLP) arrives at the Source BSR $220_1$ for the migration of the PPP from the Source BSR $220_1$ to the Target BSR $220_2$, the PPP (PPP$_1$) of the Source BSR $220_1$ begins to tunnel processed IP packets to the PPP (PPP$_2$) of the Target BSR $220_2$. More specifically, when the Source BSR $220_1$ receives a signal indicating the desired migration of the PPP from the Source BSR $220_1$ to the Target BSR $220_2$, the Source BSR $220_1$ begins tunneling IP data packets framed into PPP frames by the PPP (PPP$_1$) of the Source BSR $220_1$ to the PPP (PPP$_2$) of the Target BSR $220_2$. The PPP (PPP$_2$) of the Target BSR $220_2$ then communicates the framed PPP data to the RLP (RLP$_2$) of the Target BSR $220_2$ but retains a copy of the data in a buffer to rebuild compression states after all initial state variables have arrived. In addition to forwarding the framed data, the Source BSR $220_1$ records an IP data sequence number, V(G), of IP data being framed when the migration request was received. The Source BSR $220_1$ determines a future IP data sequence number, V(G+x), and transmits both sequence numbers, V(G) and V(G+x), and state variables (i.e., if header compression is active, the current compression state variables are sent; and if payload compression is used (only done for non-real time transmissions), an indication is sent so that the Target is able to restart/reset the compression state) of the framed data to the Target BSR $220_2$ signaling the Source BSR's $220_1$ intention to complete the migration of the PPP to the Target BSR $220_2$ before the receipt of IP data having the future sequence number, V(G+x). The Target BSR $220_2$ receives both sequence numbers and updates the sequence number, V(G), as data arrives.

The terms "IP data sequence number" and "sequence number" as used throughout this disclosure will now be defined by the inventors before continuing with the description of the various embodiments of the invention. More specifically, when PPP frames or IP packets are tunneled between a source and a target, they may be tunneled over either a proprietary tunnel or a standard tunneling mechanism such as GRE (Generic Route Encapsulation). The tunneling mechanism that is used provides the sequencing by providing for a sequence number in the encapsulating header. That is, the PPP frames or the IP packets will be encapsulated in a header defined by the tunneling mechanism and that provides a sequence number. Such a sequence number may be octet oriented (i.e., the sequence number of the first byte in the encapsulated data) or it may be frame oriented (i.e., the first encapsulated data packet will get a sequence number of one (1,) the second will be two (2) etc.). For example, GRE falls in to the latter category. Because various embodiments of the present invention described herein implement a tunneling mechanism to forward data from a source to a target and from a target to a source, is should herein be assumed that the tunneling mechanism provides sequencing numbers for the transferred data. As such, it should be noted that throughout the description of the invention when the inventors refer to an IP data sequence number or just a sequence number, the inventors are referring to the sequence numbers given to PPP frames or IP data packets by the tunneling mechanisms implemented by the various embodiments of the present invention.

Referring back to FIG. 3, if by the occurrence of the determined IP data sequence number, V(G+x), an acknowledgment from the Target BSR $220_2$ accepting the assignment of the PPP and its ability to frame received IP packets has been received by the Source BSR $220_1$, IP data having a sequence number greater than V(G+x) (e.g., V(G+x+1)) are tunnelled from the FA ($FA_1$) of the Source BSR $220_1$ to the PPP ($PPP_2$) of the Target BSR $220_2$ to be framed and buffered by the PPP ($PPP_2$) of the Target BSR $220_2$. It should be noted however, that even after an acknowledgment from the Target BSR $220_2$ is received by the Source BSR $220_1$, IP data having a sequence number less than or equal to the previously determined future sequence number, V(G+x), are continued to be processed by the PPP ($PPP_1$) of the Source BSR $220_1$. That is, before and up to the arrival of the sequence number, V(G+x), the HA 240 communicates data to the FA($FA_1$) of the Source BSR $220_1$, which communicates data to the PPP ($PPP_1$) of the Source BSR $220_1$, which frames the received data into PPP frames and tunnels the framed data to the PPP ($PPP_2$) of the Target BSR $220_2$. The PPP ($PPP_2$) of the Target BSR $220_2$ communicates the data to the RLP ($RLP_2$) of the Target BSR $220_2$ but retains a copy of the data in a buffer to rebuild compression states after all initial state variables have arrived.

Furthermore, when IP data having the sequence number V(G+x) is communicated to and processed by the PPP ($PPP_1$) of the Source BSR $220_1$, the Source BSR $220_1$ notifies the PPP ($PPP_2$) of the Target BSR $220_2$ that processing is complete at the Source BSR $220_1$ and migration will occur. In addition, the PPP ($PPP_1$) in the Source BSR $220_1$ sends an indication to the FA ($FA_1$) in the Source BSR $220_1$ to start tunneling received data to the PPP ($PPP_2$) of the Target BSR $220_2$ upon arrival of the sequence number, V(G+x). As such, after the processing of the sequence number V(G+x), the HA 240 communicates data to the FA($FA_1$) of the Source BSR $220_1$, which tunnels data to the PPP ($PPP_2$) of the Target BSR $220_1$, which frames the received data into PPP frames and communicates the PPP frames to the RLP ($RLP_2$) of the Target BSR $220_2$. The RLP ($RLP_2$) of the Target BSR $220_2$ then communicates the data to the MAC/scheduler (MAC/$SCH_2$), which forwards the data to the mobile 210.

Optionally, in an embodiment of the present invention, after the migration of the PPP from the Source to the Target an indication may be sent from the PPP of the Target back to the PPP of the Source informing it not to expect any more data packets. Prior to receiving the indication, however, any "in-transit" packets are processed by the Source.

If an acknowledgement is not received from the Target BSR $220_2$ accepting the assignment of the PPP before the occurrence of the future sequence number V(G+x), the framing of the IP data continues in the PPP ($PPP_1$) of the Source BSR $220_1$ and the framed IP data is tunnelled from the PPP ($PPP_1$) of the Source BSR $220_1$ to the PPP ($PPP_2$) of the Target BSR $220_2$. The Source BSR $220_1$ then selects a second future sequence number, V(G+nx), and forwards the second future sequence number V(G+nx) to the Target BSR $220_2$. This process continues until the Target BSR $220_2$ transmits an acknowledgment to the Source BSR $220_1$ accepting the assignment before a future sequence number determined by the Source BSR $220_1$.

Figure 4:
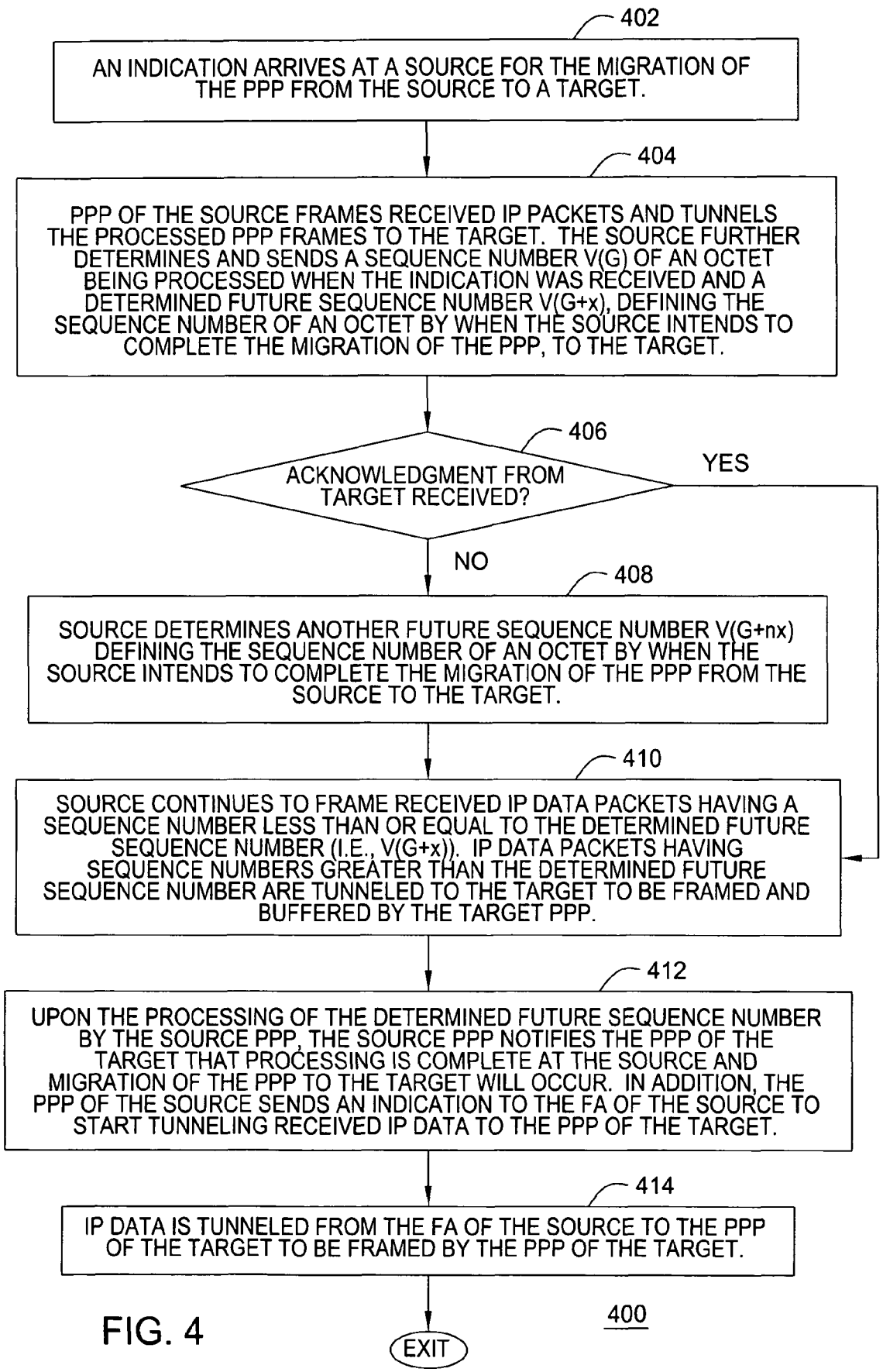
FIG. 4 depicts a high level block diagram of a method for active session mobility for point-to-point protocol (PPP) in accordance with an embodiment of the present invention.

FIG. 4 depicts an embodiment of a method for forward-link PPP migration in accordance with an embodiment of the present invention. The method 400 of FIG. 4 begins at step 402 where when an indication arrives at a Source for the migration of the PPP from the Source to a Target. The method 400 then proceeds to step 404.

At step 404, the PPP of the Source frames received IP packets and tunnels the processed PPP frames to the Target. The Source further determines and sends a sequence number V(G) of IP data being processed when the indication was received and a determined future sequence number V(G+x), defining the sequence number of IP data by when the Source intends to complete the migration of the PPP, to the Target. The method 400 then proceeds to step 406.

At step 406, the Source waits for an acknowledgment from the Target that it is willing and able to perform the framing of the IP data. If an acknowledgment has been received from the Target before the future sequence number determined by the Source, the method 400 then proceeds to step 410. If an acknowledgment has not been received from the Target before the sequence number determined by the Source, the method 400 then proceeds to step 408.

At step 408, the Source determines another future sequence number V(G+nx) defining the sequence number of IP data by when the Source intends to complete the migration of the PPP from the Source to the Target. The method 400 then returns to step 406.

At step 410, the Source continues to frame received IP data packets having a sequence number less than or equal to the determined future sequence number (i.e., V(G+x)). IP data packets having sequence numbers greater than the determined future sequence number are tunneled to the Target to be framed and buffered by the Target PPP. The method 400 then proceeds to step 412.

At step 412, upon the processing of the determined future sequence number by the Source PPP, the Source PPP notifies the PPP of the Target that processing is complete at the Source and migration of the PPP to the Target will occur. In addition, the PPP of the Source sends an indication to the FA of the Source to start tunneling received IP data to the PPP of the Target. The method 400 then proceeds to step 414.

At step 414, IP data is tunneled from the FA of the Source to the PPP of the Target to be framed by the PPP of the Target. The method 400 is then exited.

In the reverse-link direction, when an indication arrives to migrate the PPP from the Source BSR $220_1$ to the Target BSR $220_2$, the PPP ($PPP_1$) of the Source BSR $220_1$ sends an indication to the FA ($FA_1$) of the Source BSR $220_1$ to accept tunnelled IP frames from the PPP ($PPP_2$) of the Target BSR $220_2$. The PPP ($PPP_1$) of the Source BSR $220_1$ also sends an indication to the PPP ($PPP_2$) of the Target BSR $220_2$ to stop tunnelling data to the PPP ($PPP_1$) of the Source BSR $220_1$ with the next PPP frame boundary. Processing continues at the PPP ($PPP_1$) of the Source BSR $220_1$ until incoming data has stopped. At this point, the PPP ($PPP_1$) of the Source BSR $220_1$ sends an indication to the PPP ($PPP_2$) of the Target BSR $220_2$ that processing has completed and the PPP ($PPP_2$) of the Target BSR $220_2$ is instructed to tunnel IP packets to the FA ($FA_1$) of the Source BSR $220_1$. The PPP ($PPP_2$) of the Target BSR $220_2$ informs the RLP ($RLP_2$) of the Target BSR $220_2$ to begin data flow. The processed IP data is then tunnelled to the FA ($FA_1$) of the Source BSR $220_1$.

Figure 5:
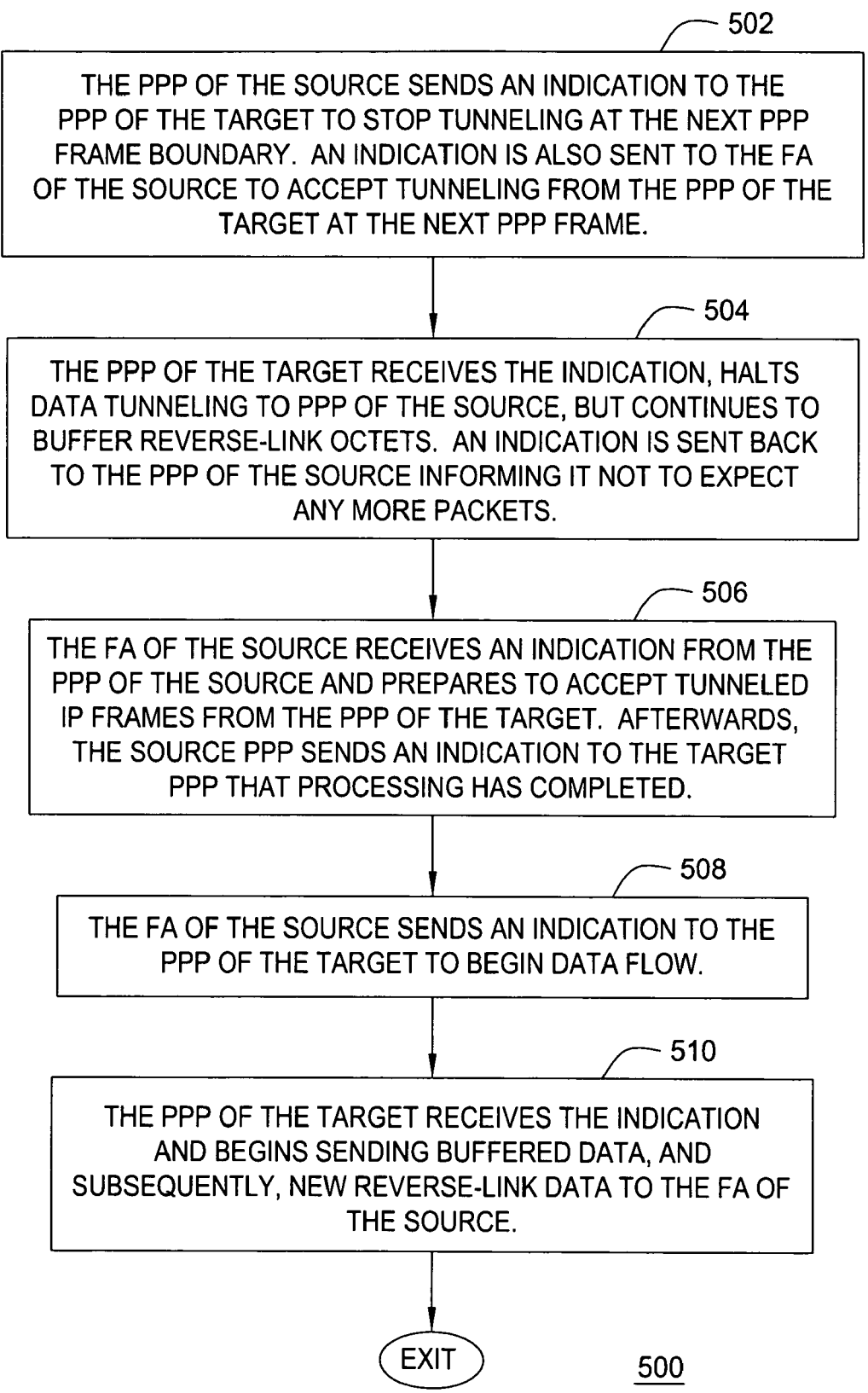
FIG. 5 depicts an embodiment of a method for reverse-link PPP migration in accordance with an embodiment of the present invention.

FIG. 5 depicts an embodiment of a method for reverse-link PPP migration in accordance with an embodiment of the present invention. The method 500 of FIG. 5 begins at step 502 where the PPP of the Source sends an indication to the PPP of the Target to stop tunneling data to the PPP of the Source at the next PPP frame boundary. An indication is also sent to the FA of the Source to accept tunneling from the PPP of the Target at the next PPP frame. The method 500 then proceeds to step 504.

At step 504, the PPP of the Target receives the indication, halts data tunneling to the PPP of the Source, but continues to buffer reverse-link IP data. An indication is sent back to the PPP of the Source informing it not to expect any more packets. The method 500 then proceeds to step 506.

At step 506, the FA of the Source receives the indication from the PPP of the Source and prepares to accept tunneled IP frames from the PPP of the Target. Any "in-transit" packets from the PPP of the Target communicated to the PPP of the Source, however, are processed by the PPP of the Source prior to the tunneling of IP frames from the PPP of the Target to the FA of the Source. The method 500 then proceeds to step 508.

At step 508, the FA of the Source sends an indication to the PPP of the Target to begin data flow. The method 500 then proceeds to step 510.

At step 510, the PPP of the Target receives the indication and begins sending buffered data, and subsequently, new reverse-link data to the FA of the Source. The method 500 is then exited.

In various embodiments of the active session PPP mobility solution of the present invention, a PPP session in a source may be migrated to a target even if not all of the phases of the PPP have been completed at the source (i.e., LCP, PAP/CHAP completed but not IPCP and CCP). In such an instance, the incomplete phases may be negotiated at the Target PPP. More specifically, when an indication arrives for the migration of the PPP from the Source BSR $220_1$ to the Target BSR $220_2$, the PPP ($PPP_2$) of the Target BSR $220_2$ sends request to the PPP ($PPP_1$) of the Source BSR $220_1$ to attain the PPP state information identified by the mobile's 210 ID. If the PPP state in the PPP ($PPP_1$) of the Source BSR $220_1$ has finished all the parameter negotiations for some (or all) of the phases, the PPP ($PPP_1$) of the Source BSR $220_1$ sends all the PPP state information for the negotiated phases for the requested mobile-ID to the PPP ($PPP_2$) of the Target BSR $220_2$. If, however, the PPP state in the PPP ($PPP_1$) of the Source BSR $220_1$ has NOT finished all the parameter negotiations for any of the phases, the PPP ($PPP_1$) of the Source BSR $220_1$ may delay the response or may send a rejection to the request from the PPP ($PPP_2$) of the Target BSR $220_2$.

However, if the PPP ($PPP_2$) of the Target BSR $220_2$ is able to support all of the PPP parameters negotiated between the PPP ($PPP_1$) of the old serving (i.e., the Source) BSR $220_1$ and the mobile 210, the PPP ($PPP_2$) of the Target BSR $220_2$ sets up the PPP state and confirms positively and the PPP is migrated. Otherwise, the PPP ($PPP_2$) of the Target BSR $220_2$ responds negatively and the PPP state is not migrated. Upon acknowledgment of the positive confirmation from the PPP ($PPP_2$) of the Target BSR $220_2$, the PPP ($PPP_1$) of the Source BSR $220_1$ starts forwarding IP packets to the PPP ($PPP_2$) of the Target BSR $220_2$ and the PPP ($PPP_2$) of the Target BSR $220_2$ begins the PPP processing.

It should be noted that although embodiments of the PPP migration of the present invention were depicted as occurring after an RLP protocol migration, it will be appreciated by those skilled in the art and informed by the teachings of the present invention that the concepts of PPP migration in accordance with the present invention may be applied in networks wherein RLP is not implemented and as such, PPP migration may be initiated at substantially any desired time as determined by a user and as described above.

In accordance with embodiments of the present invention, the migration of the Foreign Agent occurs after the migration of the PPP. In the BSR network 200, migration of the FA ($FA_1$) from the Source BSR $220_1$ begins after the MAC, RLP, and PPP have fully migrated to a Target BSR $220_2$.

Before the FA can finally move from the Source BSR $220_1$ to the Target BSR $220_2$, Mobile-IP registration must first complete. That is, at the start of FA migration, an Advertisement is first sent from the FA ($FA_2$) of the Target BSR $220_2$ to the mobile 210. While the registration procedure occurs, forward-link data continues to flow as described above. At the time the HA 240 diverts packet flow to the tunnel established to the FA ($FA_2$) of the Target BSR $220_2$, any "in-transit" packets that have been sent to the FA ($FA_1$) of the Source BSR $220_1$ are still processed by the FA ($FA_1$) of the Source BSR $220_1$ and tunnelled to the FA ($FA_2$) of the Target BSR $220_2$. Any new incoming forward-link packets directed toward the FA ($FA_2$) of the Target BSR $220_2$ are buffered. After a timeout period to wait for any of the "in-transit" data tunnelled from the FA ($FA_1$) of the Source BSR $220_1$ to be processed in the FA ($FA_2$) of the Target BSR $220_2$, control transfers to the FA ($FA_2$) of the Target BSR $220_2$, which now begins transmission of any buffered data and enables new incoming data flow. In this manner, interruption of forward-link packet flow is minimized or eliminated all-together. The timeout period described above may be defined by a timer similar to the timer described above for the active session mobility solution for PPP of the present invention, which may function to reduce the number of times that the FA needs to be transferred. In an alternate embodiment of the present invention, an indication may be sent to the FA ($FA_2$) of the Target BSR $220_2$ informing the Target BSR $220_2$ when the last IP data has been tunnelled from the FA ($FA_1$) of the Source BSR $220_1$ to the FA ($FA_2$) of the Target BSR $220_2$.

Figure 6:
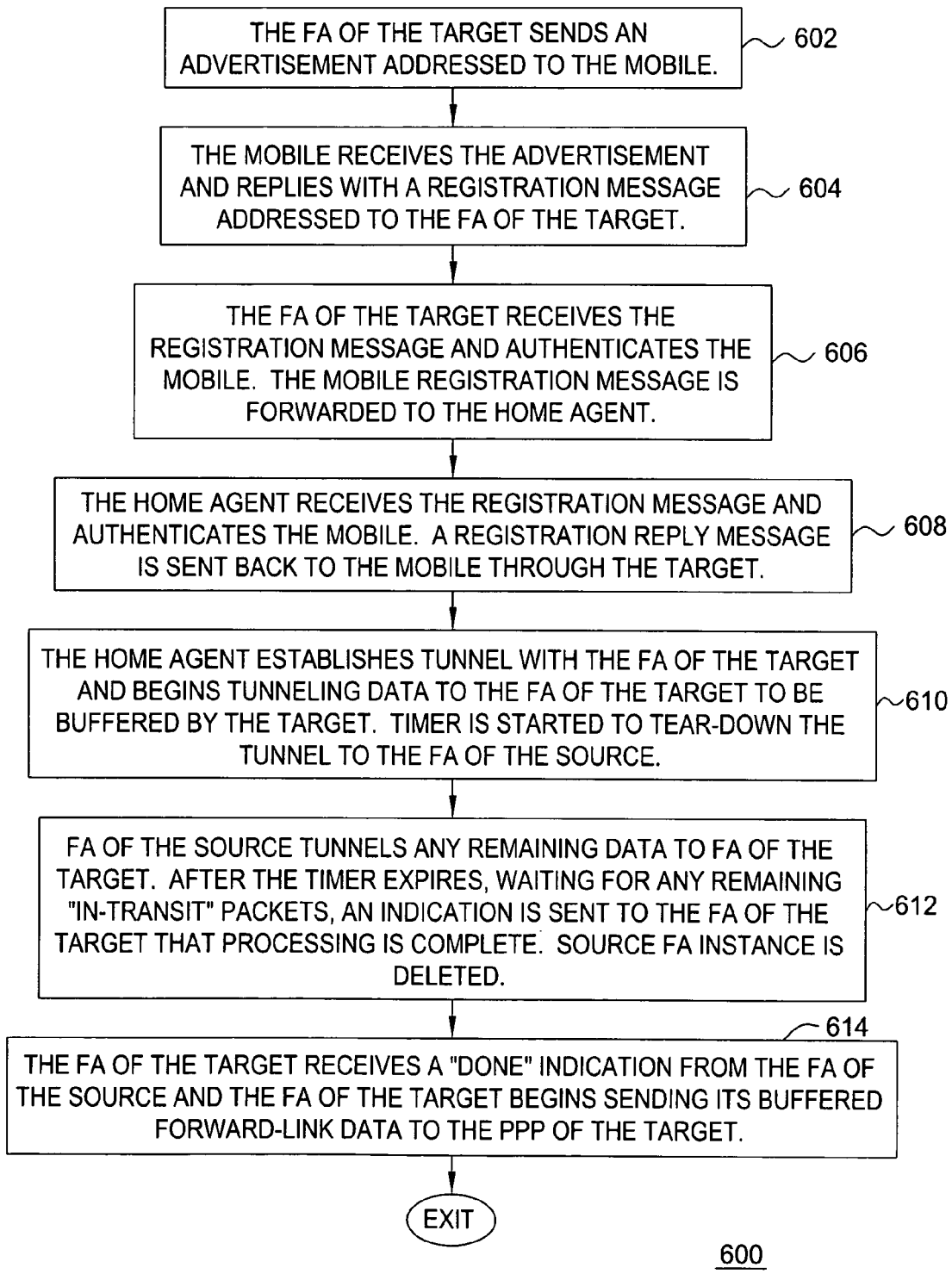
FIG. 6 depicts an embodiment of a method for forward-link FA migration in accordance with an embodiment of the present invention.

FIG. 6 depicts an embodiment of a method for forward-link FA migration in accordance with an embodiment of the present invention. The method 600 of FIG. 6 begins at step 602 where the FA of the Target sends an Advertisement addressed to the mobile. The method 600 then proceeds to step 604.

At step 604, the mobile receives the Advertisement and replies with a Registration message addressed to the FA of the Target. The method 600 then proceeds to step 606.

At step 606, the FA of the Target receives the Registration message and authenticates the mobile. The mobile Registration message is forwarded to the Home Agent. The method 600 then proceeds to step 608.

At step 608, the Home Agent receives the Registration message and authenticates the mobile. A Registration Reply message is sent back to the mobile through the Target. The method 600 then proceeds to step 610.

At step 610, the Home Agent establishes tunnel with the FA of the Target and begins tunneling data to the FA of the Target to be buffered by the Target. Timer is started to tear-down the tunnel to the FA of the Source. The method 600 then proceeds to step 612.

At step 612, the FA of the Source tunnels any remaining data to the FA of the Target. After the timer expires, waiting for any remaining "in-transit" packets, an indication is sent to the FA of the Target that processing is complete. The Source FA instance is deleted. The method then proceeds to step 614.

At step 614, the FA of the Target receives a "done" indication from the FA of the Source and the FA of the Target begins sending its buffered forward-link data to the PPP of the Target. The method 600 is exited.

In the reverse-link direction, data flow is maintained through the Source BSR $220_1$ until the HA 240 returns with the Registration Reply message. The reply indicates that the tunnel through the FA ($FA_1$) of the Source BSR $220_1$ is about to be torn down, therefore data-flow is halted from the PPP ($PPP_2$) of the Target BSR $220_2$ to the FA ($FA_1$) of the Source BSR $220_1$. Reverse-link data flow resumes to the FA ($FA_2$) of the Target BSR $220_2$ when forward-link data arrives at the FA ($FA_2$), indicating establishment of the HA/FA tunnel (e.g., tunnel from the HA 240 to the FA ($FA_2$)) to the Target BSR $220_2$.

Although various embodiments of an active session PPP migration solution of the present invention have been depicted with respect to a BSR network architecture, it will be appreciated by those skilled in the art and informed by the teachings of the present invention that the concepts of an active session PPP migration solution of the present invention may be applied in substantially any network implementing a point to point protocol (PPP). More specifically and for example, the concepts of an active session PPP migration solution of the present invention may be applied in the conventional CDMA hierarchical wireless IP network 100 of FIG. 1 to actively migrate a PPP session among various PDSNs 130 caused by, for example, the mobility of the access terminal 110.

Although various embodiments of an active session PPP migration solution in accordance with the present invention are described as tunneling IP data from a source to a target and vice-versa, it should be noted that various other methods of forwarding data from a source to a target are known in the art, and such other forwarding methods may be implemented to transfer data from a source to a target and vice-versa in accordance with alternate embodiments of the present invention.

While the forgoing is directed to various embodiments of the present invention, other and further embodiments of the invention may be devised without departing from the basic scope thereof. As such, the appropriate scope of the invention is to be determined according to the claims, which follow.

What is claimed is:

1. A method for seamless active session migration of a point-to-point protocol (PPP) session layered on top of a lower level mobile protocol from a source to a target in a wireless Internet Protocol (IP) network, the method comprising:

tunneling framed IP data of said PPP session from said source toward said target after a migration of a reverse-link of the lower level mobile protocol from said source toward said target;

determining a future IP data sequence number by which framing of IP data of said PPP session will begin at said target; and tunneling pre-framed IP data of said PPP session having sequence numbers greater than said determined IP data sequence number toward said target to be framed by said target for transmitting toward an access terminal associated with said PPP session.

2. The method of claim 1, wherein the tunneling of framed IP data of said PPP session from said source toward said target begins when said source receives an indication that said PPP session is to be migrated to said target.

3. The method of claim 1, wherein the tunneling of pre-framed IP data of said PPP session having sequence numbers greater than said determined IP data sequence number toward said target begins when an acknowledgment from said target is received by said source.

4. The method of claim 3, wherein said acknowledgment from said target indicates the readiness of said target to begin framing IP data of said PPP session.

5. The method of claim 3, further comprising:

when said acknowledgment from said target is not received by said source prior to occurrence of said determined IP data sequence number at said source, determining a more future IP data sequence number by which framing of IP data of said PPP session will begin at said target.

6. The method of claim 1, wherein IP data of said PPP session having sequence numbers less than or equal to said determined IP data sequence number are continued to be framed by said source and tunneled toward said target.

7. The method of claim 1, wherein said pre-framed IP data of said PPP session having sequence numbers greater than said determined IP data sequence number are tunneled to said target and maintained in a buffer of said target until an acknowledgment is received from said source that a last segment of IP data of said PPP session has been framed by said source.

8. The method of claim 7, wherein said last segment of IP data of said PPP session framed by said source is an IP data segment having said determined IP data sequence number.

9. The method of claim 1, wherein said target begins framing of said pre-framed IP data prior to said source completing all phases of framing.

10. The method of claim 9, wherein phases of framing uncompleted by said source are completed by said target.

11. The method of claim 1, wherein said pre-framed IP data of said PPP session tunneled by said source toward said target is tunneled by said target toward a second target.

12. The method of claim 11, wherein said second target is a target from which the access terminal associated with said PPP session is receiving a stronger pilot signal.

13. The method of claim 11, wherein said pre-framed IP data of said PPP session tunneled by said target toward said second target is framed by said second target and communicated by said second target toward the access terminal associated with said PPP session.

14. The method of claim 1, wherein said IP data sequence number by which framing of IP data of said PPP session will begin at said target is determined by said source.

15. The method of claim 1, wherein said pre-framed IP data of said PPP session having sequence numbers greater than said determined IP data sequence number are tunneled toward said target by a foreign agent of said source.

16. The method of claim 1, wherein said pre-framed IP data of said PPP session having sequence numbers greater than said determined IP data sequence number are framed by said target and communicated by said target in a forward-link direction to be segmented by a reliable protocol in said target.

17. The method of claim 1, further comprising:
  causing said target to stop tunneling IP data of said PPP session to said source;
  buffering newly received IP data of said PPP session in said target; and
  upon receiving an indication from said source that said source has framed and communicated a last IP data segment, processing the buffered IP data of said target.

18. The method of claim 17, wherein said framed IP data of said target and said source are communicated in a reverse-link direction to a foreign agent of said source.

19. The method of claim 17, wherein said framed IP data of said target and said source are communicated in a reverse-link direction toward a home agent.

20. The method of claim 1, wherein said source and said target comprise base station routers.

21. The method of claim 1, wherein said source and said target comprise packet data serving nodes (PDSNs).

22. The method of claim, 1 further comprising:
  migrating a foreign agent (FA) session from said source to said target in said wireless IP network, wherein said migrating of said FA session comprises:
    upon completion of said PPP session migration, sending an Advertisement from said target toward the access terminal associated with said PPP session to cause said access terminal to be authenticated by a home agent;
    upon authentication of said access terminal, tunnelling IP data of said PPP session from said home agent toward said target to be buffered by said target; and
    upon receiving an indication that said source has communicated a last IP data segment, processing said buffered IP data in said target.

23. The method of claim 22, wherein said migrating said FA session further comprises:
  causing said target to stop tunneling framed IP data of said PPP session toward said source;
  buffering newly received IP data of said PPP session in said target; and
  upon receiving an indication from said source that said source has processed a last IP data segment, processing said buffered IP data in said target.

24. The method of claim 23, wherein said buffered IP data in said target is communicated toward a home agent by a foreign agent of said target.

25. The method of claim 1, wherein said lower level mobile protocol comprises a Radio Link Protocol (RLP).

26. A method for seamless active session migration of a point-to-point protocol (PPP) session layered on top of a lower level mobile protocol from a source to a target in a wireless Internet Protocol (IP) network, the method comprising:
  in a forward-link direction,
    forwarding framed IP data of said PPP session from said source toward said target after a migration of a reverse-link of the lower level mobile protocol from said source toward said target;
    determining a future IP data sequence number by which framing of IP data of said PPP session will begin at said target; and
    upon receiving an acknowledgment from said target, forwarding pre-framed IP data of said PPP session having sequence numbers greater than said determined IP data sequence number toward said target to be framed by said target and transmitted by said target toward an access terminal associated with said PPP session.

27. The method of claim 26, further comprising:
  in a reverse-link direction,
    causing said target to stop forwarding toward said source reverse-link IP data of said PPP session to be processed by said source;
    buffering newly received reverse-link IP data of said PPP session in said target; and
    upon receiving an indication from said source that said source has processed a last IP data segment, processing the buffered IP data of said target.

28. The method of claim 25, wherein said RLP is adapted for use in a CDMA wireless networks.

29. The method of claim 25, wherein said RLP is adapted for use in a GSM wireless networks.

30. The method of claim 26, wherein said lower level mobile protocol comprises a Radio Link Protocol (RLP).

* * * * *